(12) United States Patent
Sherman et al.

(10) Patent No.: US 6,929,737 B2
(45) Date of Patent: Aug. 16, 2005

(54) METHOD OF REMOVING CONTAMINANTS FROM PETROLEUM DISTILLATES

(75) Inventors: Jeffrey H. Sherman, Dallas, TX (US); Richard T. Taylor, Oxford, OH (US); Amanda L. Hofacker, Oxford, OH (US); James W. Hershberger, Oxford, OH (US); Garrett M. Conn, Hinckley, OH (US); William A. Gorman, Corpus Christi, TX (US)

(73) Assignee: Miami University, Oxford, OH (US)

( * ) Notice: Subject to any disclaimer, the term of this patent is extended or adjusted under 35 U.S.C. 154(b) by 426 days.

(21) Appl. No.: 09/753,496

(22) Filed: Jan. 2, 2001

(65) Prior Publication Data

US 2001/0025807 A1 Oct. 4, 2001

Related U.S. Application Data

(63) Continuation of application No. 09/465,637, filed on Dec. 17, 1999, now Pat. No. 6,238,551, which is a continuation-in-part of application No. 09/265,903, filed on Mar. 10, 1999, now Pat. No. 6,320,090, and a continuation-in-part of application No. 09/250,741, filed on Feb. 16, 1999, now Pat. No. 6,007,701.

(51) Int. Cl.[7] .................. C10M 175/00; C10M 175/02; C10G 19/02
(52) U.S. Cl. ...................... 208/179; 208/181; 208/183; 208/283; 208/291
(58) Field of Search ............................... 208/179, 181, 208/183, 283, 291

(56) References Cited

U.S. PATENT DOCUMENTS

| | | | | |
|---|---|---|---|---|
| 4,021,333 A | * | 5/1977 | Habiby et al. | 208/179 |
| 4,287,049 A | | 9/1981 | Tabler et al. | 208/180 |
| 5,041,206 A | | 8/1991 | Sequeira, Jr. | |
| 5,208,382 A | * | 5/1993 | Perozzi et al. | 568/22 |
| 5,242,579 A | | 9/1993 | Mead et al. | |
| 5,814,207 A | | 9/1998 | Kenton | 208/184 |
| 5,880,325 A | | 3/1999 | Alward et al. | 585/833 |
| 5,904,760 A | | 5/1999 | Hayner | 106/279 |
| 5,911,817 A | | 6/1999 | Hayner | 106/279 |
| 6,007,701 A | | 12/1999 | Sherman et al. | 208/181 |
| 6,013,176 A | * | 1/2000 | Greaney et al. | 208/251 R |
| 6,072,065 A | | 6/2000 | Chavet | 554/195 |
| 6,117,309 A | | 9/2000 | Daspit et al. | 208/184 |
| 6,174,431 B1 | * | 1/2001 | Williams et al. | 208/183 |
| 6,179,999 B1 | | 1/2001 | Sherman et al. | |
| 6,238,551 B1 | * | 5/2001 | Sherman et al. | 208/181 |
| 6,270,678 B1 | | 8/2001 | Chavet | 210/708 |
| 6,319,394 B2 | * | 11/2001 | Sherman et al. | 208/181 |

FOREIGN PATENT DOCUMENTS

| | | | |
|---|---|---|---|
| EP | 0 429 197 A1 | 5/1991 | |
| GB | 1594879 | 8/1981 | C10M/11/00 |
| WO | WO 97/00928 | 1/1997 | |
| WO | WO 99/13033 | 3/1999 | |
| WO | WO 99/61565 | 12/1999 | |

* cited by examiner

Primary Examiner—Walter D. Griffin
Assistant Examiner—Tam M. Nguyen
(74) Attorney, Agent, or Firm—Moser, Patterson & Sheridan, L.L.P.

(57) ABSTRACT

In a method of removing acidic compounds, color, and polynuclear aromatic hydrocarbons, and for removing or converting hydrocarbons containing heteroatoms from petroleum distillates, phase transfer catalyst is employed to facilitate the transfer of inorganic or organic bases to the substrate of the distillate. An inorganic or organic base, a phase transfer catalyst selected from the group including quaternary ammonium salts, polyol ethers and crown ethers, and used oil distillate are mixed and heated. Thereafter, contaminants are removed from the used oil distillate through distillation. A solvent is then mixed with the resulting distillate to extract contaminants therefrom. The solvent is recovered and distilled to separate the contaminants therefrom, and is then reused. The petroleum distillate having the contaminants separated therefrom is also distilled to remove any remaining solvent therefrom, with the recovered solvent being reused.

45 Claims, 4 Drawing Sheets

METHOD OF REMOVING CONTAMINANTS FROM PETROLEUM DISTILLATES

CROSS REFERENCE TO RELATED APPLICATION

This application is a continuation under 37 C.F.R. §1.53 (b) of U.S. application Ser. No. 09/465,637 filed on Dec. 17, 1999, now U.S. Pat. No. 6,238,551, which is a continuation-in-part of U.S. application Ser. No. 09/250,741 filed on Feb. 16, 1999, now U.S. Pat. No. 6,007,701, and a continuation-in-part of U.S. application Ser. No. 09/265,903 filed on Mar. 10, 1999, now U.S. Pat. No. 6,320,090.

TECHNICAL FIELD

This invention relates generally to the removal of contaminants from used oil, and more particularly to a method of removing acidic compounds, color, and polynuclear aromatic hydrocarbons, and removing or converting heteroatoms from petroleum distillates, particularly used motor oil distillates.

BACKGROUND AND SUMMARY OF THE INVENTION

It has long been recognized that used motor oils can be recycled by removing the contaminants which accumulate therein during operation of the motor vehicles in which the motor oils are utilized. Recently, the American Society for Testing and Materials (ASTM) has promulgated its Designation: D 6074-99 wherein the ASTM Committee D-2 on Petroleum Products and Lubricants has promulgated standards for re-refined base oils. Included in Designation: D 6074-99 are numerous attributes of base oils, including attributes relating to physical properties, compositional properties, chemical properties, and toxicological properties.

Prior to World War II used motor oil was re-refined using a process involving the addition of sulphuric acid in order to separate the contaminants from the useful hydrocarbon components of used motor oil. Re-refining processes of the type involving the addition of sulphuric acid to used motor oil are no longer used because they result in the generation of large amounts of highly toxic acidic sludge which cannot be disposed of economically. Additionally, such re-refining techniques do not fulfill the requirements of ASTM Designation: D 6074-99.

More recently, used motor oils have been re-refined utilizing a process known as hydrotreating. In accordance with the hydrotreating process, used motor oils are treated with hydrogen at high temperature and pressure. Hydrotreating is successful in saturating olefins and aromatics in used motor oils and can also be used in removing heteroatoms therefrom. However, the hydrotreating process is expensive to the point that it cannot be operated profitably.

U.S. Pat. No. 5,814,207 discloses a used motor oil re-refining method and apparatus wherein up to four evaporators are connected one to another in a series. It will therefore be understood that the apparatus of the '207 patent is expensive to install and use. More importantly, the used motor oil re-refining method of the '207 patent cannot meet the requirements of ASTM Designation: D 6074-99 because it cannot remove heteroatoms and because it cannot meet the toxicological requirements of the designation.

Co-pending U.S. application Ser. No. 09/250,741 filed Feb. 16, 1999, and assigned to the assignee hereof discloses a re-refining process wherein used motor oil is treated with an organic or inorganic base in the presence of a phase transfer catalyst. The process is successful in removing acidic compounds and color and in removing or substituting heteroatoms from used motor oil distillates. Co-pending application Ser. No. 09/265,903 filed Mar. 24, 1999, and also assigned to the assignee hereof discloses a re-refining process wherein used motor oil is contacted with a highly polar organic solvent, such as N,N-dimethylformamide. The process is successful in removing polynuclear aromatic hydrocarbons, sulphur-containing substances, nitrogen-containing substances, and other contaminants from used motor oil and distillates.

The present invention comprises a process for re-refining used motor oils wherein the process of application Ser. No. 09/250,741 and the process of application Ser. No. 09/265,903 are operated in series. The process of the invention is unique in that it is the only known process which safely and economically fulfills all of the requirements of ASTM Designation: D 6074-99.

BRIEF DESCRIPTION OF THE DRAWINGS

A more complete understanding of the invention may be had by reference to the following Detailed Description when taken in conjunction with the accompanying Drawings wherein.

DETAILED DESCRIPTION

Figure 1A:
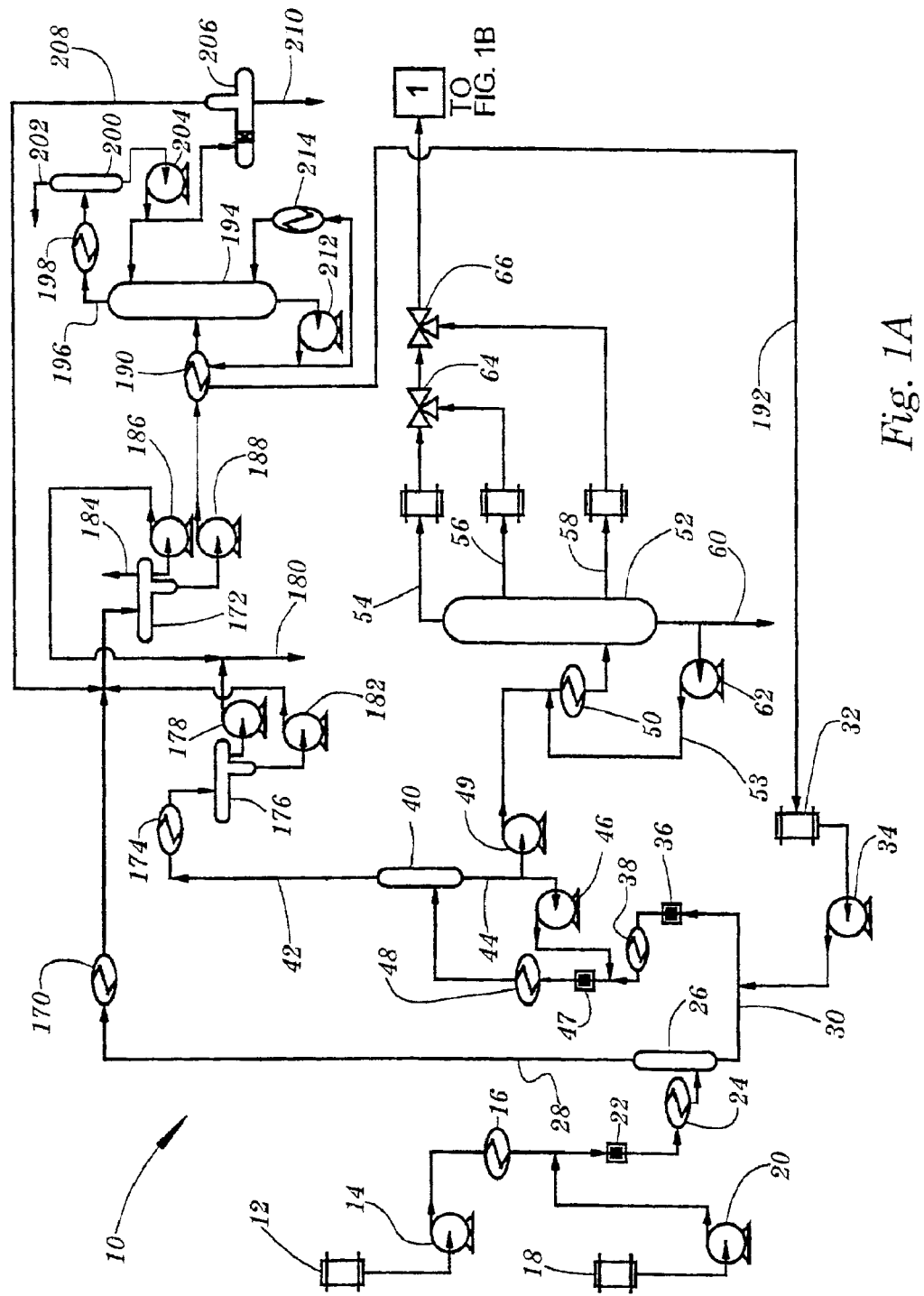
FIG. 1A is the first part of a diagrammatic illustration of a method of removing contaminants from petroleum distillates comprising the preferred embodiment of the invention.

The process of the present invention removes acidic compounds and color from used motor oil and other petroleum distillates. Additionally, the process removes and/or substitutes hydrocarbons containing heteroatoms, namely chlorine, boron, phosphorous, sulfur and nitrogen from the used motor oil. In removing these classes of compounds and to neutralize organic acids, the process uses inorganic and/or organic bases. Further, the process is capable of removing polynuclear aromatic hydrocarbons from used motor oil. The process makes use of a class of catalysts known as phase transfer catalysts, which are employed in the process to facilitate the transfer of inorganic or organic bases to the substrate in the used oil.

Examples of phase transfer catalysts that may be utilized in the process include: quaternary ammonium salts, polyol ethers, glycols and crown ethers. Through either the base catalysis or the neutralization reactions, undesirable components of the distillate oil are most often converted to forms that are easily removed from the used oil through distillation. Components that are not removed from the distillate are transposed to forms that may remain in the distillate with no adverse effect on the oil quality.

The invention is capable of operating in either a batch mode or a continuous flow mode. When operated in the batch mode, used oil may be contacted with a phase transfer catalyst and a base. Heat may be applied and the mixture is vigorously stirred. After the appropriate reaction time, the base and catalyst are washed out of the used oil with water, after which the remaining oil is distilled. For best results in the batch process, the initial used oil should be wide cut oil prepurified by wide cut distillation.

When the process is operated in the continuous flow mode, the oil, base, and catalyst may be heated and mixed in appropriate order, passing through heat exchangers, in-line mixers, and tanks as required to effectively treat the oil. The mixture may then be passed directly to the distillation apparatus, where additional mixing occurs and the catalyst and resulting oil are recovered as separate streams. The catalyst is recovered in a highly purified form and may be reused.

Although other phase transfer catalysts can be used in the process, the use of ethylene glycol is preferred because, when ethylene glycol is used, the source of the catalyst can be used glycol-based engine coolants. Thus, the catalyst can be acquired in raw form with little, if any, expenditure.

Following removal of the catalyst and distillation of the lubricating oil cuts, the distilled oil is directed to a liquid/liquid extraction apparatus. The distillate and a solvent, preferably a higher polar organic solvent such as N,N-dimethylformamide, are counter-flowed through the extraction apparatus, whereby the solvent removes contaminants from the distillate. Typical types of extraction devices include mixer/settler combinations, non-agitated columns, and agitated columns. The following discussion assumes the use of a Karr column, which is an agitated column design.

Figure 1B:
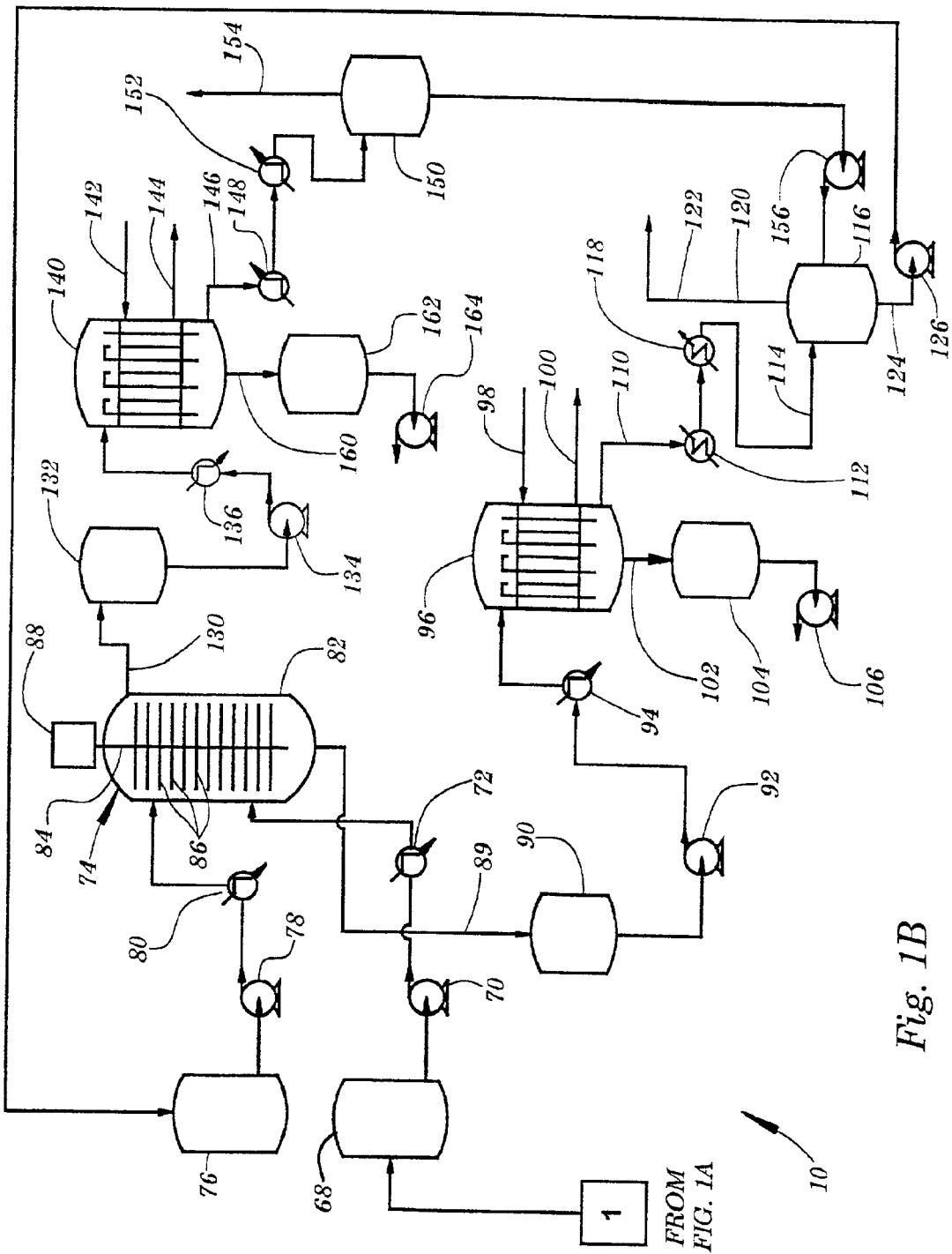
FIG. 1B is a continuation of FIG. 1A.

An exemplary process for removing contaminants from used motor oil 10 comprising a continuous flow process is shown in FIGS. 1A and 1B. In the process 10, the used oil from a source 12 is passed through a used oil feed pump 14 to a heater 16. At the same time, an aqueous solution of a base, e.g., a 50% aqueous solution of sodium or potassium hydroxide, is directed from a source 18 through a base feed pump 20 and into the used oil after it passes through and is heated to 70 to 125° C. by the heater 16. The amount of base added to the used oil is such that the concentration of base in the oil, on a dry weight basis, is between 0.5 and 5 weight percent. The used oil and base pass through an in-line mixer 22 and a heater 24, heating the mixture to 110 to 160° C. The used oil mixture is then passed into a water flash drum 26 where water and a small amount of naphtha are removed through flash outlet 28. The water flash drum is best operated at low positive pressure, e.g., 0.8 to 1.1 barg., thus allowing a higher feed temperature to promote the reactions. However, in principle the flash drum could operate under vacuum. The resultant dehydrated used oil mixture is then removed from the water flash drum 26 through a flash oil outlet 30.

A phase transfer catalyst from a source 32 is passed through a catalyst feed pump 34 and into the dehydrated used oil mixture. The amount of phase transfer catalyst that is added to the used oil is such that the concentration of catalyst in the resulting mixture ranges from 1 to 10 weight percent of the used oil. The used oil feed pump 14, the caustic feed pump 20, and the catalyst feed pump 34 are each engaged at flow rates that provide the desired amounts of each material. The used oil mixture is passed through an in-line mixer 36 and a heater 38, where it is heated to between about 275 and 350° C., blended with the recycled bottoms stream from recycle pump 46, passed through in-line mixer 47, heated in heater 48, and directed into a stage I evaporator 40. Heating the mixture beyond 350° C. is not recommended as temperatures above 350° C. can result in excessive cracking of the used oil molecules. The stage I evaporator is typically operated under vacuum, with pressures ranging from about 150 to 300 millimeters of mercury. The catalyst and light hydrocarbons are removed through flash catalyst outlet 42 and the oil is removed through oil outlet 44. Part of the oil passes through a recycle pump 46 and back into the dehydrated used oil mixture after the in-line mixer 36, but before the heater 48.

The remainder of the oil passes through a stage II feed pump 49 and a heater 50, where it is heated to from about 300 to 350° C., and into a stage II evaporator 52. The stage II evaporator operates under vacuum with pressures ranging from 0.5 to 5 millimeters of mercury. The stage II evaporator may be operated at lower temperatures, but this will result in a lower yield of the heavier base oil product. The stage II evaporator separates the oil into three fractions, the viscosities of which depend upon the used oil feed. The table below lists products from a typical used oil feed:

| Fraction | Color | Chlorine | Viscosity @ 40° C. |
| --- | --- | --- | --- |
| light base oil | <0.5 | <5 ppm | 100 SUS |
| Medium base oil | <1.0 | <5 ppm | 150 SUS |
| heavy base oil | <1.5 | <5 ppm | 300 SUS |
| still bottoms | n/a | n/a | n/a |

The light base oil is recovered through outlet 54, the medium base oil through outlet 56, the heavy base oil through outlet 58, and the still bottoms through outlet 60.

The still bottoms resulting from the simultaneous combination of the catalyzed base treatment with distillation yields important properties when combined with asphalt. In general, the still bottoms comprise a high value asphalt modifier, capable of extending the useful temperature range of most straight run asphalts. Specifically, the still bottoms impart favorable low temperature characteristics to asphalt, while maintaining the high temperature properties of the asphalt.

Part of the still bottoms are directed through a pump 62 and are recirculated through a line 53 and the heater 50 into the stage II evaporator. The light base oil, medium base oil, and heavy base oil each flow to a dedicated holding tank. Each of the base oils is fed to the extraction section in sequence in blocked operation, i.e. a tank of light base oils processed, then a tank of medium base oil, then a tank of heavy base oil, then the cycle repeats.

Referring to FIG. 1B, the oil is directed through a tank 68 and a pump 70 and a heat exchanger 72 to the bottom of an extraction apparatus 74, such as a Karr column. Simultaneously a solvent is directed from a source 76 through a pump 78 and through a heat exchanger 80 which increases the temperature of the solvent to the top of the Karr column 74. The solvent which is utilized in the practice of the invention may be a highly polar organic solvent, such as N,N-dimethylformamide (DMF). Other solvents in the class acetonitrile may also be used in the practice of the invention. The polarity of the solvent may be adjusted by the addition of water and/or other materials depending upon the requirements of particular applications of the invention.

The Karr column 74 includes a tank 82 having a rod 84 vertically disposed therein. A plurality of shelves 86 are secured to the rod 84 for vertical reciprocation thereby. The rod 84 extends to an actuator 88 which functions to reciprocate the rod 84 and the shelves 86 vertically at a predetermined rate.

Each of the shelves 86 has a plurality of holes formed therethrough. Because the solvent from the source 76 is relatively more dense, it tends to move downwardly in the tank 82 relative to the upwardly moving petroleum. Conversely, because the petroleum distillate is relatively less dense, it tends to move upwardly in the tank 82 relative to the solvent. The vertical reciprocation of the shelves 86 and the fact that the shelves 86 have holes therethrough substantially increases the surface area between upwardly moving petroleum and the downwardly moving solvent. By this means the solvent functions to extract contaminants which are present in the petroleum distillate therefrom, and to carry the extracted contaminants upwardly out of the tank 82.

The solvent having the contaminants from the petroleum distillate dissolved therein is recovered from the tank 82 through an outlet 89 and is directed to a surge tank 90. From the surge tank 90 the solvent/contaminant solution is directed through a pump 92 and through a heat exchanger 94 which increases the temperature of the solution to a falling film evaporator 96.

The falling film evaporator 96 is heated by a heating medium, e.g. steam or thermal oil, which received through an inlet 98 and recovered through an outlet 100. The falling film evaporator 96 functions to evaporate the solvent, thereby separating the solvent from the contaminants dissolved therein. The contaminants are recovered from the falling film evaporator 96 through an outlet 102. The contaminants flow through a surge tank 104 to a pump 106 for which directs the contaminants to suitable utilization apparatus. For example, the contaminants may be directed to an asphalt storage tank, or blended into plant fuel and burned.

The solvent is recovered from the falling film evaporator 96 through an outlet 110 and is directed to heat exchangers 112 and 118 which remove heat from the solvent. Solvent from exchanger 118 is directed through an outlet 114 to a surge tank 116. Solvent which remains in the vapor stage is directed to a vent 122. Solvent from the surge tank 116 is directed through an outlet 124 to a pump 126 which returns the solvent to the source 76.

Petroleum distillate having the contaminants removed therefrom is recovered from the tank 82 through an outlet 130 and is directed to a surge tank 132. From the surge tank 132 the petroleum distillate is directed through a pump 134 and through a heat exchanger 136 which adds heat to the petroleum distillate to a falling film evaporator 140. The falling film evaporator 140 is actuated by steam which is received through an inlet 142 and recovered through an outlet 144.

The falling film evaporator 140 functions to remove any remaining solvent from the petroleum distillate. The solvent is recovered from the falling film evaporator 140 through an outlet 146 and is directed to heat exchangers 148 and 152, which remove heat from the solvent. Solvent recovered from the heat exchanger 152 is directed to a surge tank 150. Any solvent remaining in the vapor phase is directed to a vent 154. Liquid solvent from the surge tank 150 is directed to a pump 156 which returns the solvent to the source 76 through the tank 116 and the pump 126.

Petroleum distillate having substantially all polynuclear aromatic hydrocarbons, sulphur and nitrogen-containing substances and other contaminants removed therefrom is recovered from the falling film evaporator 140 through an outlet 160. The petroleum distillate passes through a surge tank 162 and from the surge tank 162 to a pump 164 which directs the petroleum distillate to storage facilities and/or further processing apparatus.

Referring particularly to FIG. 1A, the water, any glycol contained in the used oil feed, and light hydrocarbons from the flashdrurn 26 are directed through the outlet 28 to a condenser 170, and from the condenser 170 to a liquid/liquid separator 172. The catalyst and light hydrocarbons from the stage I evaporator are directed through the vapor outlet 42 and through a condenser 174 to a liquid/liquid separator 176. The less dense liquid from the separator 176 is directed through a pump 178 and is recovered at an outlet 180. The heavier liquid from the separator 176 is directed through pump 182 to the separator 172.

Vapors and gases from the separator 172 are vented at an outlet 184. Less dense liquid from the separator 172 is directed through a pump 186 and are recovered at the outlet 180. More dense liquid from the separator 172 is directed through a pump 188 to a heater 190 where the heavy liquid recovers heat from the dry catalyst leaving the bottom of the distillation tower 174. Cooled dry catalyst from the heater 190 comprises dry catalyst which is returned to the source 32 through a line 192. The heated heavy liquid from the heater 190 is directed through a distillation tower 194.

The distillation tower 174 separates the feed into low boiling and high boiling cuts. The low boiling cut is directed through an outlet 196 through a condenser 198, and from the condenser 198 to a receiver 200. Gases are vented from the receiver 200 through outlet 202. Liquid from the receiver 200 is directed to a pump 204. Part of the output of the pump 204 is returned to the distillation tower 194. The remainder of the output of the pump 204 is directed to a coalescer 206. Light liquid from the coalescer 206 is directed to the separator 172 through a line 208. Waste water is recovered from the coalescer 206 through an outlet 210.

The heavy cut from the distillation tower 194 is directed to a pump 212. Part of the output of the pump 212 is directed to the heater 190. The remainder of the output from the pump 212 is directed through a heater 214 and is returned to the distillation tower 194.

Figure 2A:
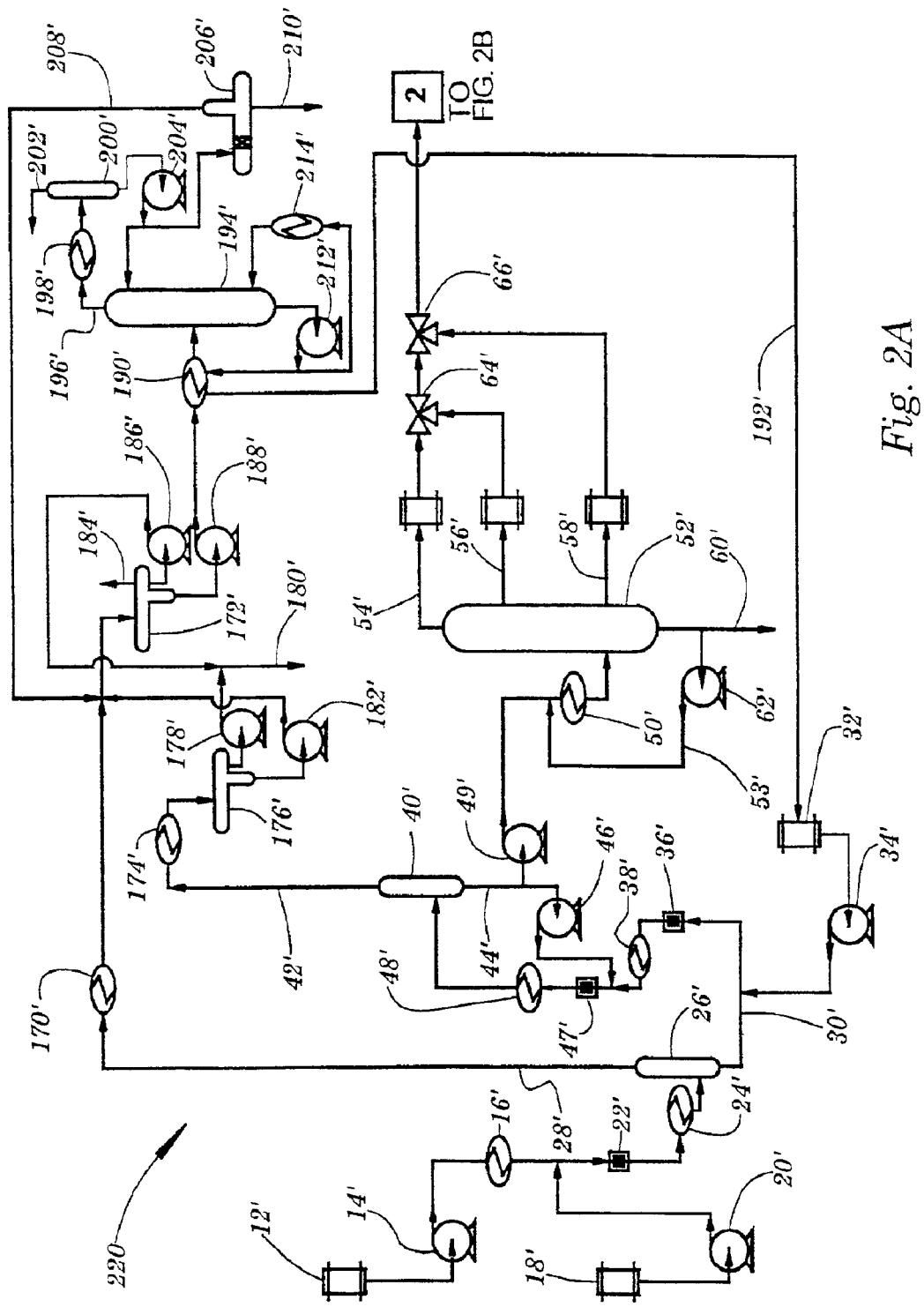
FIG. 2A is the first part of a diagrammatic illustration of a method of removing contaminants from petroleum distillates comprising a variation of the preferred embodiment.
Figure 2B:
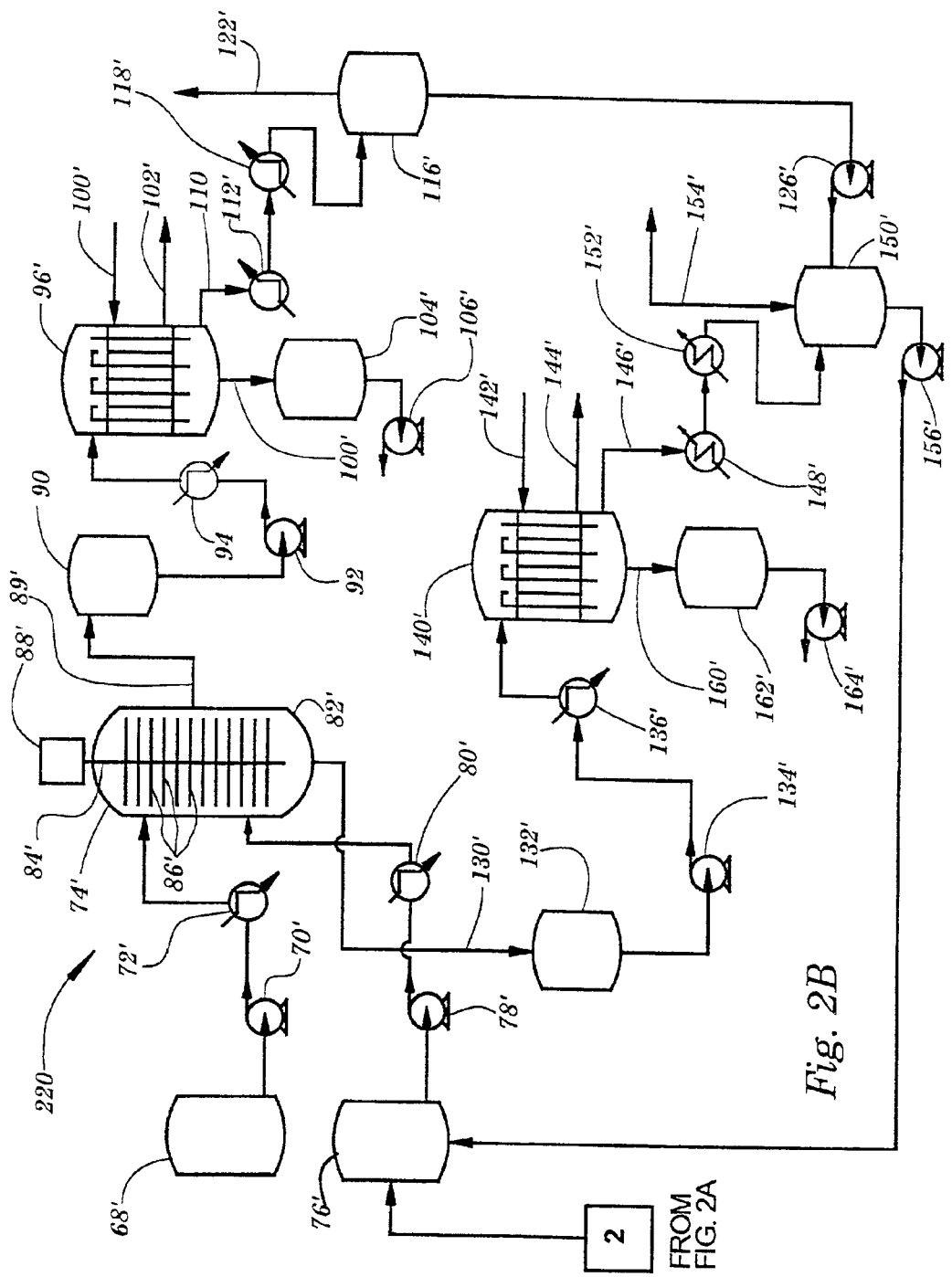
FIG. 2B is a continuation of FIG. 2A.

FIGS. 2A and 2B illustrate an exemplary system 220 for removing polynuclear aromatic hydrocarbons and other contaminants from a petroleum distillate. The system 220 includes numerous component parts which are substantially similar in construction and function to the component parts of the system 10 illustrated in FIGS. 1A and 1B and described hereandabove in connection therewith. Such identical component parts are designated in FIGS. 2A and 2B with the same reference numerals utilized above in the description of the system 10, but are differentiated thereof by means of a prime (') designation.

The system 220 of FIGS. 2A and 2B differ from the system 10 of FIG. 1 in that the system 220 is utilized in those instances in which the solvent is lighter, i.e., less dense, than the petroleum distillate. In such cases the solvent is directed to the bottom of the tank 82 and is recovered from the top thereof after extracting the polynuclear aromatic hydrocarbons from the petroleum distillate. Conversely, the petroleum distillate is directed to the top of the tank 82 and is recovered from the bottom thereof following removal of the polynuclear aromatic hydrocarbons and other contaminants from the petroleum distillate by the action of the solvent. Otherwise, the operation of the system 300 of FIGS. 2A and 2B is similar to the operation of the system 10 of FIGS. 1A and 1B.

The present invention is highly successful in improving the quality of used oil distillates. Thus, in the practice of the invention, the concentration of polynuclear aromatic hydrocarbons in used oil distillates is reduced from about 200 ppm to about 1 ppm, or to even lower concentrations depending upon the requirements of particular applications of the invention. The use of the method of the invention is also successful in reducing the color of used oil distillates to a level comparable with that of used oil distillates that have been hydrotreated.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A method for purifying used motor oil, comprising:
   mixing the used motor oil with a phase transfer catalyst in the presence of a base compound, wherein the phase transfer catalyst comprises a glycol;
   mixing the used motor oil with a solvent that comprises N,N-dimethylformamide to dissolve contaminants from the used motor oil into the solvent; and then
   separating the solvent from the used motor oil.

2. The method of claim 1, wherein the phase transfer catalyst comprises ethylene glycol.

3. The method of claim 1, further comprising removing contaminants from the used motor oil by distilling the used motor oil at a temperature of about 200° C. to about 275° C. and a pressure of about 100 torr to about 200 torr.

4. The method of claim 1, further comprising removing contaminants from the used motor oil by distilling the used motor oil at a temperature of about 275° C. to about 300° C. and a pressure of about 0.05 torr to about 0.2 torr.

5. The method of claim 1, further comprising removing contaminants from the used motor oil by distilling the used motor oil at a temperature of about 200° C. to about 300° C. and a pressure of about 0.05 torr to about 200 torr.

6. The method of claim 1, wherein the base compound is an inorganic or organic base compound.

7. The method of claim 6, wherein the inorganic base compound is selected from the group consisting of sodium hydroxide, potassium hydroxide, and combinations thereof.

8. The method of claim 1, wherein a mixture of the used motor oil and phase transfer catalyst comprises about 1% to about 10% by weight of the phase transfer catalyst.

9. The method of claim 1, further comprising separating the contaminants from the solvent.

10. The method of claim 9, further comprising recycling the solvent.

11. The method of claim 1, wherein separating the solvent from the used motor oil comprises extraction.

12. The method of claim 1, wherein separating the solvent from the used motor oil comprises flowing the solvent counter to the used motor oil within means for extraction.

13. The method of claim 12, wherein means for extraction comprises a mixer, agitated column, non-agitated column, Karr column or combinations thereof.

14. The method of claim 1, wherein the solvent is a polar organic compound.

15. A method for removing contaminants from a used petroleum distillate, comprising:
   mixing the used petroleum distillate with ethylene glycol in the presence of a base compound;
   mixing the used petroleum distillate with a solvent that comprises N,N-dimethylformamide to dissolve contaminants from the used petroleum distillate into the solvent; and then
   separating the solvent from the used petroleum distillate.

16. The method of claim 15, wherein the used petroleum distillate comprises motor oil.

17. The method of claim 15, wherein separating the solvent from the used petroleum distillate comprises distilling the used petroleum distillate at a temperature of about 200° C. to about 275° C. and a pressure of about 100 torr to about 200 torr.

18. The method of claim 15, wherein separating the solvent from the used petroleum distillate comprises distilling the used petroleum distillate at a temperature of about 275° C. to about 300° C. and a pressure of about 0.05 torr to about 0.2 torr.

19. The method of claim 15, wherein separating the solvent from the used petroleum distillate comprises distilling the used petroleum distillate at a temperature of about 200° C. to about 300° C. and a pressure of about 0.05 torr to about 200 torr.

20. The method of claim 15, wherein a mixture of the used petroleum distillate and ethylene glycol comprises about 1% to about 10% by weight of ethylene glycol.

21. The method of claim 15, further comprising separating the contaminants from the solvent.

22. The method of claim 21, further comprising recycling the solvent.

23. The method of claim 15, wherein separating the solvent from the petroleum distillate comprises extraction.

24. The method of claim 15, wherein separating the solvent from the used petroleum distillate comprises flowing the solvent counter to the used petroleum distillate within means for extraction.

25. The method of claim 24, wherein means for extraction comprises a mixer, agitated column, non-agitated column, Karr column or combinations thereof.

26. The method of claim 15, wherein the solvent is a polar organic compound.

27. A method for removing contaminants from used motor oil, comprising:
   mixing the used motor oil with ethylene glycol in the presence of an inorganic base compound;
   mixing the used motor oil with a solvent that comprises N,N-dimethylformamide to dissolve contaminants from the used motor oil into the solvent;
   separating the solvent from the used motor oil; and then
   separating the contaminants from the solvent.

28. The method of claim 27, wherein the inorganic base compound is selected from the group consisting of sodium hydroxide, potassium hydroxide, and combinations thereof.

29. The method of claim 27, wherein mixture of the used motor oil and ethylene glycol comprises about 1% to about 10% by weight of the ethylene glycol.

30. The method of claim 27, further comprising recycling the solvent.

31. The method of claim 27, wherein separating the solvent from the used motor oil comprises extraction.

32. The method of claim 27, wherein separating the solvent from the used motor oil comprises flowing the solvent counter to the used motor oil within means for extraction.

33. The method of claim 32, wherein the means for extraction comprises a mixer, agitated column, non-agitated column, Karr column or combinations thereof.

34. The method of claim 27, wherein the solvent is a polar organic compound.

35. A method for removing contaminants from used motor oil, comprising:
   mixing the used motor oil with a glycol in the presence of a inorganic base compound;
   mixing the used motor oil with N,N-dimethylformamide to dissolve contaminants from the used motor oil into the solvent;

separating the N,N-dimethylformamide from the used motor oil; and then separating the contaminants from the solvent.

36. The method of claim 35, wherein the inorganic base compound is selected from the group consisting of sodium hydroxide, potassium hydroxide, and combinations thereof.

37. The method of claim 35, wherein the glycol comprises ethylene glycol.

38. The method of claim 35, wherein a mixture of the motor oil and phase transfer catalyst comprises about 1% to about 10% by weight of the phase transfer catalyst.

39. The method of claim 35, wherein a mixture of the motor oil and base compound comprises about 0.5% to about 5% by weight of the base compound in volume of solution.

40. The method of claim 35, wherein separating N,N-dimethylformamide from the motor oil comprises extraction.

41. The method of claim 35, wherein separating N,N-dimethylformamide from the motor oil comprises flowing the solvent counter to the motor oil within means for extraction.

42. The method of claim 41, wherein means for extraction comprises a mixer, agitated column, non-agitated column, and Karr column.

43. The method of claim 1, wherein a concentration of the base compound in the used oil is between 0.5 and 5 weight percent on a dry weight basis.

44. The method of claim 15, wherein a concentration of the base compound in the used petroleum distillate is between 0.5 and 5 weigh percent on a dry weight basis.

45. The method of claim 27, wherein a concentration of the base compound in the used motor oil is between 0.5 and 5 weight percent on a dry weight basis.

* * * * *